(12) United States Patent
Hsu et al.

(10) Patent No.: US 6,604,425 B1
(45) Date of Patent: Aug. 12, 2003

(54) MICROELECTROMECHANICAL CORRELATION DEVICE AND METHOD

(75) Inventors: Tsung-Yuan Hsu, Westlake Village, CA (US); Robert Y. Loo, Agoura Hills, CA (US); Juan F. Lam, Manhattan Beach, CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

(21) Appl. No.: 09/591,113

(22) Filed: Jun. 9, 2000

(51) Int. Cl.[7] ............................................. G01L 9/12
(52) U.S. Cl. ........................................................ 73/718
(58) Field of Search .......................... 73/718, 733, 749, 73/745, 753, 723, 717; 310/314

(56) References Cited

U.S. PATENT DOCUMENTS

| | | |
|---|---|---|
| 4,570,490 A | * 2/1986 | Antonazzi ................. 73/718 X |
| 5,633,552 A | 5/1997 | Lee et al. |
| 5,888,845 A | 3/1999 | Bashir et al. |
| 5,928,968 A | 7/1999 | Bothra et al. |

* cited by examiner

*Primary Examiner*—Hezron Williams
*Assistant Examiner*—C Dickens
(74) *Attorney, Agent, or Firm*—Ladas & Parry

(57) ABSTRACT

A method and apparatus for comparing a force to a signal, or comparing two signals, through mechanical movement of capacitive plates in a transducer. The transducer plates are separated by d, which in one embodiment is preferably a linear function of a pressure or force F. In that embodiment, application of a signal $i(t+\tau)$ to the plates will cause a voltage representing a correlation between F and i to appear between the plates. In another embodiment, instead of an external mechanical force or pressure, an electrical signal V related to a signal S may drive the transducer plates to achieve a voltage indicating a correlation between S and the signal input $i(t+\tau)$. Transducers to practice the invention may be microelectromechanical devices fabricated using integrated circuit techniques to permit small size and low cost.

28 Claims, 3 Drawing Sheets

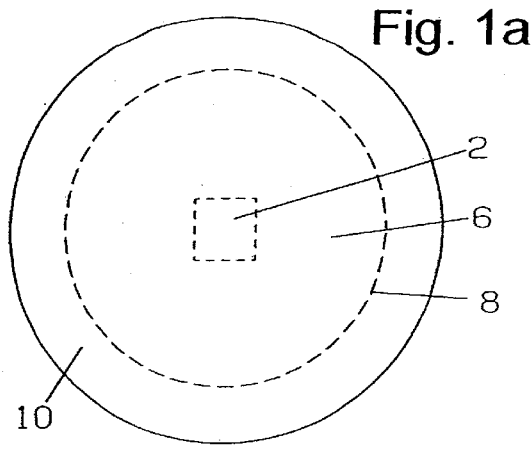
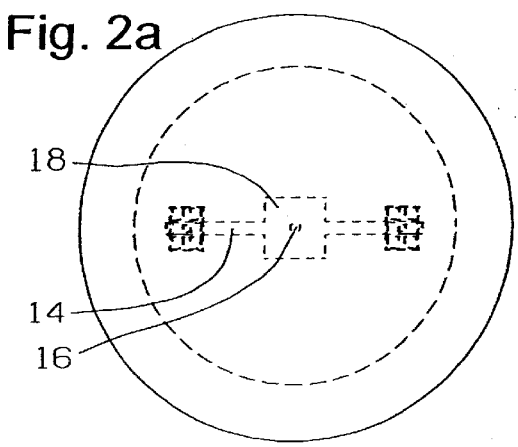
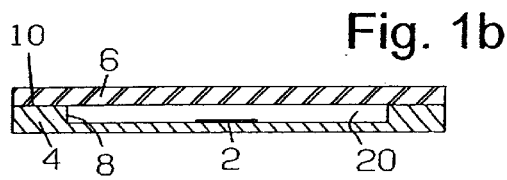
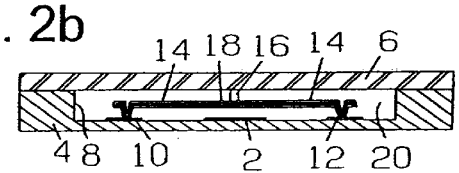
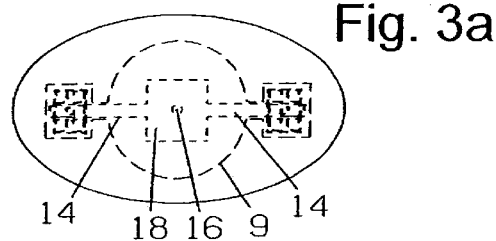
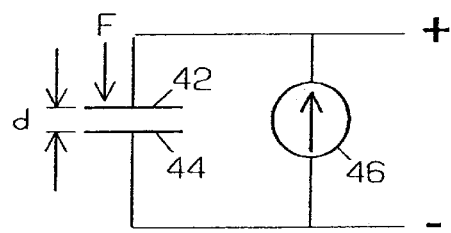
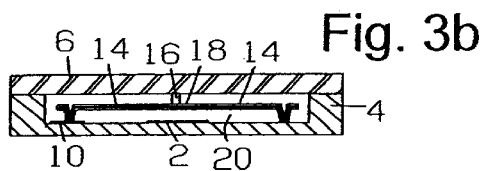
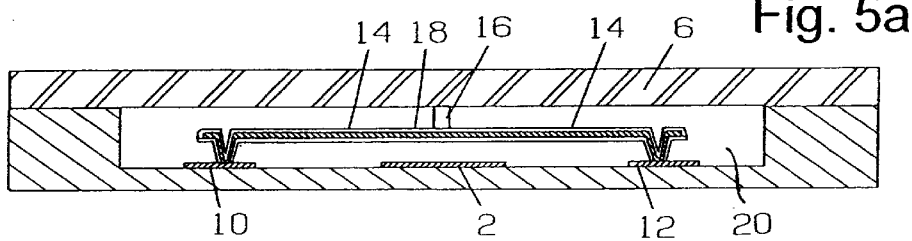
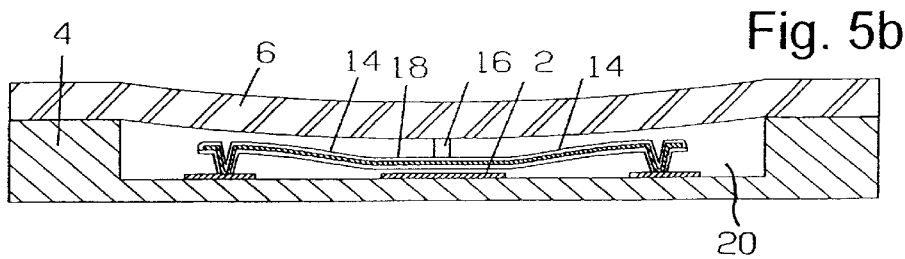

MICROELECTROMECHANICAL CORRELATION DEVICE AND METHOD

FIELD OF THE INVENTION

The present invention pertains to capacitive pressure or force transducers, and in particular to the correlation of two signals with each other by means of such transducers.

BACKGROUND

It is useful to match one time-varying pressure signal with another. Pressure waves in fluids, such as audible sounds or SONAR responses, can be compared with previously recorded pressure wave signals in order to recognize or identify their signature. However, comparison of signal outputs from known sensors in real time, i.e. as the signal is produced, is not readily done except by converting the signals to digital representations and performing intense computational algorithms on the representative data. It is desirable to perform signal comparisons without a need for such computation.

Pressure or force transducers are known which rely upon a variation in capacitance between conductive plates which move with respect to each other under the influence of force or pressure. It is known to fabricate pressure transducers on substrates, similarly as an integrated circuit, in order to take advantage of batch processing capabilities, microminiaturization, and compatibility with integrated circuit manufacture. For example, U.S. Pat. No. 5,888,845 to Bashir, et al. describes a capacitive pressure transducer utilizing a membrane of heavily doped semiconductor crystal as a flexible, electrically conductive plate which shifts position with respect to a fixed perforated metallization layer. Pressure waves in such a device must be conducted through perforations in the metallization.

It is known to provide micromachined piezoelectric cantilevers to sense sound wave pressure. For example, U.S. Pat. No. 5,633,552 to Lee, et al. describes a pressure sensor micromachined from piezoelectric material for use as microphones and as microspeakers. However, piezoelectric material senses only change in position, and thus the output is related to the derivative of the position caused by the force, rather than being directly related to the position caused by the force. Moreover, the piezoelectric material is not compatible with some integrated circuit fabrication techniques.

The existing art provides transducers, but does not solve the problem of comparing signals using such transducers to reduce computation. Thus, a need exists for a method of comparing signals using a device which might function as a transducer.

SUMMARY OF THE INVENTION

The present invention addresses the above-noted needs and provides further benefits. The invention provides a method of comparing signals with each other by using physical movement of capacitive plates. The comparison output preferably represents a correlation function of the input signals. In one aspect, the invention compares a time-varying pressure with a second signal, the second signal representing, for example, a previously recorded time-varying pressure. In another aspect, the invention compares two signals to each other. In another aspect the invention provides devices which are useful to provide such comparison of signals by correlation function.

One embodiment of a sensor to practice the force comparison method of the present invention has a particularly useful relationship between applied pressure (force) and resulting capacitive plate spacing, such that an applied time-varying pressure can be correlated with an analog signal which may, for example, be derived from a reference time-varying pressure. In this embodiment, the distance d between two capacitive plates varies substantially as a linear function of an applied pressure p, i.e. $\Delta d = k(p)$. An $I(t)$ signal applied to the plates will therefore provide an output voltage $V_O(t)$ which is the correlation function of $I(t)$ with $p(t)$. Thus, if $I(t)$ represents a reference pressure signal $P_0(t)$, which has perhaps been previously recorded, the presently applied pressure signal $p(t)$ can be effectively correlated to $P_0(t)$. Also, since a time offset between $I(t)$ and $p(t)$ could cause a phase difference which would neutralize any correlation, a variable delay factor $\tau$ should be added to the signal $I(t)$ so that it becomes $I(t+\tau)$.

Any sensor constructed to yield a linear change in capacitive plate displacement as a function of pressure may be used with the inventive method of correlation taught herein. However, a preferred sensor is a microelectromechanical device constructed by semiconductor processing methods, in which regions of deposited metal provide the capacitive plates. Preferably, one of the metal regions is deposited upon a semiconductor substrate while the other metal region is supported by a beam, this plate-supporting beam being separated from the substrate by etching, and supported from the substrate on one or two ends. The plate-supporting beam is positioned under a diaphragm, which preferably contacts the plate-supporting beam through a contact point. In this embodiment, the area under the diaphragm is preferably evacuated, and then the diaphragm is sealed around the plate.

In one aspect, the invention permits real-time comparison of two electrical signals, which may accordingly represent any signal source. The distance d between two capacitive plates can be made to vary as a function of an applied voltage $v(t)$ which corresponds to a first of the two signals. Then, a current corresponding to a second of the two signals may be applied to the capacitive plates, yielding a voltage which is indicative of the correlation function between the two signals. In this case, if V is the voltage applied to cause variation in the plate separation distance d, $d = k_1(V)^{2/3}$, and therefore the applied voltage must be preprocessed from the signal $S(t)$ with which correlation is sought, such that the driving voltage $V(t) = k_2(S^{3/2}(t))$.

A preferred embodiment of a device to practice this aspect of the present invention provides a micromechanical cantilevered beam supporting a conductive plate to which a voltage is applied with respect to an anchor plate. The voltage, which corresponds to the first signal, thereby applies a force to move the cantilevered beam in accordance with the first signal. The conductive plate is thus moved with respect to a capacitive sensing plate, so that a voltage, which is produced on the capacitive sensing plate by an applied current corresponding to the second signal, indicates a correlation of the first and second signals.

Thus, devices according to the present invention provide an ability to compare analog signals in real time, without digital conversions and intense computation, and indicate a correlation between the analog signals by a resultant voltage. In one aspect one of the signals is a physical force or pressure signal, but an immediate physical signal is not necessary to practice the comparison method of the invention.

Preferred embodiments of devices suitable for practicing the invention may be fabricated using batch integrated circuit manufacturing techniques. These embodiments perform the comparison function in a small region, permitting comparison of physically small force loci such as fluid pressure waves, including audible sounds, and also due to their small size permit a substantial frequency range of operation. Moreover, these embodiments lend themselves to formation of arrays of such sensors.

BRIEF DESCRIPTION OF THE DRAWINGS

FIG. 1a is a top view of a capacitive diaphragm pressure transducer.

FIG. 1b is a section view of the transducer of FIG. 1a.

FIG. 2a is a top view of a diaphragm transducer using a beam supported plate.

FIG. 2b is a section view of the transducer of FIG. 2a.

FIG. 3a is a top view of a different diaphragm transducer arrangement.

FIG. 3b is a section view of the transducer of FIG. 3a.

FIG. 4 schematically represents a circuit for use with the present invention.

FIGS. 5a, b show the transducer of FIG. 2b without and with pressure applied.

DESCRIPTION OF THE PREFERRED EMBODIMENTS

Figure 6A:
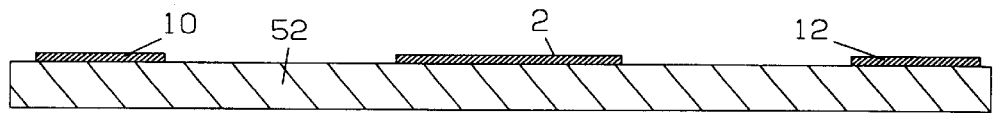
FIGS. 6a–d show a section view of fabrication steps for MEM transducer plates.

In order to compare two signals according to the present invention, a physical capacitive device is required. According to a preferred embodiment, such a device preferably has capacitive plates which are separated by a distance d which varies as a linear function of an applied force or pressure. FIGS. 1a and 1b show a top and side view, respectively, of a device which accomplishes such a relationship to a good approximation. Substrate 4 supports a capacitive plate 2 which is separated from diaphragm 6 by a distance, which is d. The region 20 enclosed by diaphragm 6 is defined by circular wall 8, and is preferably evacuated. In that case, diaphragm 6 is uniformly loaded, edge-clamped, and circular, and the pressure dependence of the diaphragm is: $y(x)=-3(r^2-x^2)^2(1-\mu^2)p/(16Y\ t^3)$, where x is the radial distance from the center, r is the radius, and t is the thickness for the diaphragm, and Y and $\mu$ are Young's modulus and Poisson's ratio, respectively. The center displacement, at x=0, is $y(0)=-3\ r4\ (1-\mu^2)p/(16\ Y\ t^3)$, which for r=5/64 inch, t=0.004 inches, and for a stainless steel having $\mu=0.305$ and $Y=27.6\times10^6$ psi, the displacement is $(4\times10^6)$ p inches. For p=100 psi, $y(0)=4\times10^{-4}$ inches $\approx 10\ \mu m$. Finally, the spacing d between the conductive diaphragm 6 and capacitive plate 2 is expected to be a good approximation of the distance at the center, x=0, as long as plate 2 is very small compared to the diameter of the diaphragm.

An alternative way to assure linearity of the capacitive plate spacing response to the diaphragm center displacement is to use the center of the diaphragm to actuate a separate transducer element as shown in top and side views in FIGS. 2a and 2b, respectively. A comparable diaphragm 6, substrate 4, circular wall 8, plate 2, and region as in FIGS. 1a and 1b is shown, but now upper plate 18 is supported by a beam 14 which connects the plate to substrate 4 at left beam end pad 10 or right beam end pad 12, or both. Pip 16, centered on the diaphragm and on the upper plate, may be used to ensure that upper plate 18 moves according to the position of the center of diaphragm 6. Under some circumstances upper plate 18 might cease to press against diaphragm 6, and for such circumstances pip 16 is preferably adhesive in nature. For linearity, the resistance of the beam-supported upper plate 18 must be negligible compared to the diaphragm resistance.

FIGS. 3a and 3b represent one of the ways in which a beam-supported capacitive plate 18 actuated by diaphragm 6, preferably via pip 16, can be utilized with smaller diaphragm areas. In this case, support wall 9 surrounds upper plate 18 more closely, such that upper plate 18 is distinctly more predictably parallel to capacitive plate 2 than would be a diaphragm of any significant bending. FIG. 3b shows a connection to upper plate 18 through left beam end pad 10, but right beam end pad 12 is omitted. In this embodiment, the right end may be allowed to float rather than being anchored to the substrate. The float of the beam support serves two purposes: first, the beam resistance to movement is reduced, making any nonlinearity of the beam force-displacement function more negligible compared to the dominant diaphragm force-displacement function; and second, the ease with which the unanchored beam support permits flexing of the beam reduces a tendency of upper plate 18 to bow at extremes of travel due to tension in beam 14. Both of these effects tend beneficially to preserve response linearity. However, since in many instances neither effect will be significant, floating the right beam end is not called for in all instances.

FIG. 4 shows a schematic representation of a circuit used with the present invention. Upper plate 42 is driven with respect to lower capacitive plate 44 by current source 46, which can be constructed for particular applications by any method, or which many are presently known in the art d is the distance between upper and lower plates 42 and 44, and d varies as a function of time d(t) with F, which is also a function of time F(t). Preferably, $d(t)=d_0-(k_2 F(t))$ over the time and force of interest. The voltage of upper plate 42 is represented by A and that of lower plate 44 is represented by B, while current source 46 supplies a comparison signal i(t) along with a delay factor $\tau$, that is, $i(t+\tau)$. Then:

$$v_{AB}(t) = \int_0^t i(t+\tau)/C(t)dt$$

We have said that $F(t)=k_1\ d(t)$; and for capacitive area A, $C(t)=\epsilon_0\ A/d(t)$; and hence, $$V_{AB} = 1/(k_1\varepsilon_0 A)\int_0^t F(t)i(t+\tau)dt$$

As can be seen from the last equation, $V_{AB}$ is proportional to the correlation between F(t) and i(t), with alignment delay $\tau$.

FIGS. 5a and 5b show the effect of plate area 18 as diaphragm 6 flexes. Because upper plate area 18 is much wider than supporting beam 14, beam 14 does almost all of the bending when pip 16 presses against upper plate 18. As mentioned with regard to FIG. 3b, flexing of upper plate 18 may be reduced even farther, if necessary, by allowing one end of supporting beam 14 to float rather than being anchored to substrate 4.

Figure 7:
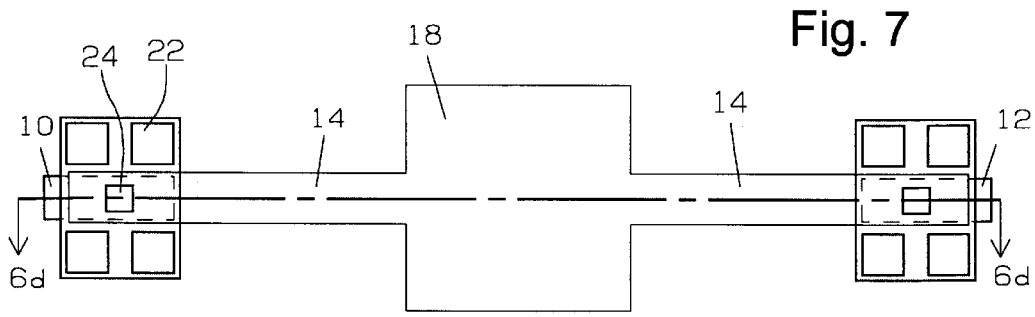
FIG. 7 is a top view of the transducer of FIGS. 61a–d.

Approximate dimensions for a preferred structure as shown in FIGS. 5a and 5b are as follows: upper plate 18 is square, and approximately 0.33 mm on a side. Beam 14 is approximately 0.35 mm from plate 18 to interconnect anchor 24 (FIG. 7). Region 20 of the diaphragm structure is evacuated such that, in the ambient pressure of choice, the spacing between upper plate 18 and capacitive plate 2 is about 2 microns, and the dynamic range is about +/−1 micron for a diaphragm similar to that described with respect to FIGS. 1a and 1b, which yields a dynamic pressure range of about +/−10 psi. Of course, the smaller diaphragm shown in FIGS. 3a and 3b could be readily fabricated to provide a similar dynamic range by using thinner or weaker materials. It is desirable for some applications that pip 16 be adhesively placed, or indeed be a bit of adhesive material; but in some instances upward pressure from upper plate 18 may keep pip 16 in compression so that upper plate 18 follows the movement of diaphragm 6.

With a spacing between upper plate 18 and capacitive plate 2 of 2 microns, and plate area of about 0.1 mm², the capacitance will be about 0.5 picofarad, and a signal current of 0.1 $\mu$A applied for 100 $\mu$s will yield about 20V.

Devices for use in this embodiment of the present invention lend themselves to fabrication using common integrated circuit techniques, as shown by the fabrication sequence depicted in FIGS. 6a through 6d. First, a suitable substrate 4 has metallization patterned thereon to form pads 10 and 12, and capacitive plate 2. Interconnect metallization would generally also be patterned at this time, though it is not shown; any technique may be employed to provide the patterned metallization, including for example lithographic resist lift-off, resist definition and metal etch, or less common techniques. This metallization is preferably begun with about 250–500 Å of Ti to ensure adhesion to the substrate, followed by about 1000 Å of Pt to protect the Ti from diffusion of Au, and about 2000 Å of Au; however, aluminum or other metals are satisfactory for many purposes.

Figure 6B:
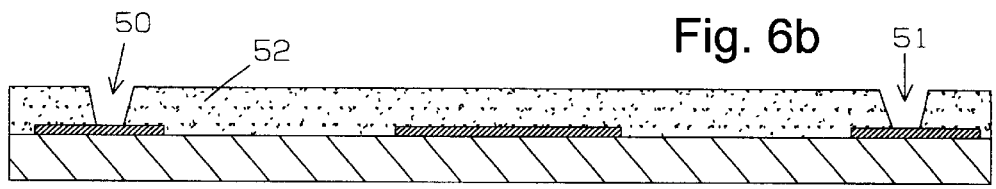

FIG. 6b shows a sacrificial layer 52 which has been disposed. In the present example, the thickness of this layer is typically 2 to 20 microns, but the desired thickness will depend upon application. The material is preferably silicon dioxide, but any compatible material may be used which is readily removed both vertically and laterally without excessively affecting other layers. After layer 52 is deposited by any compatible technique, such as plasma enhanced chemical vapor deposition (PECVD) or sputtering, the sacrificial layer is patterned and selectively etched to create features 50 and 51. One or both of these will be used to interconnect the substrate to upper plate 18. Those skilled in the art will recognize that similar features in sacrificial layer 52 will permit other features, such as 22 (FIG. 7) which need not include metallization, to provide a support for beam 14 which is anchored to substrate 4.

Figure 6C:
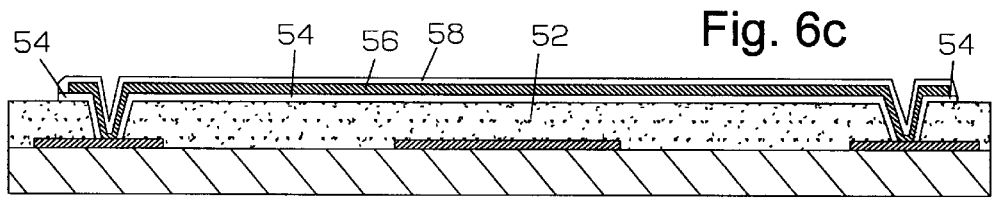

FIG. 6c shows that insulating and structural layer 54 has been deposited and patterned by any compatible technique. Layer 54 is preferably silicon nitride or other material with a significantly different etch rate than the sacrificial layer 52. The pattern includes access through layer 54 such that metallization layer 56, disposed next, can interconnect first metallization layer pads 10, 12 and form the metallization of beam 14. This metallization, typically sputter deposited, is preferably 200 Å of Ti followed by 1000 Å of Au (thinner than the metallization mentioned above), but of course alternative metals and thicknesses may be selected. Following the deposition and patterning of metallization layer 56, second dielectric layer 58 is preferably disposed thereover. It is generally preferred that insulating layers 54 and 58 are of the same material, for example silicon nitride, and the same thickness, for example 500 Å, so as to balance stresses in the beam. Such balancing is not required for all applications.

Figure 6D:
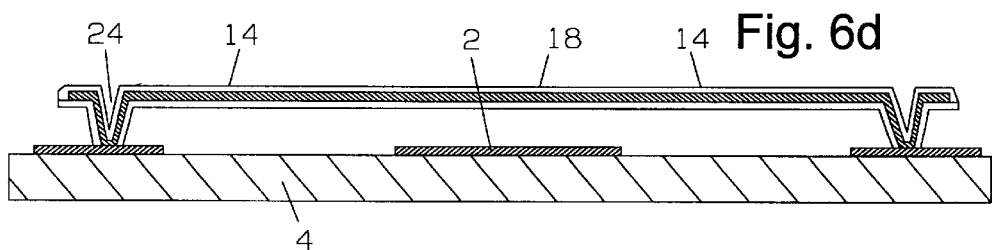

FIG. 6d shows the section view of the beam-supported capacitive-plate transducer after a further step of etching away the sacrificial layer 52, leaving the beam 14 and plate 18 separated from substrate 4.

The dimensions of such a structure may be varied widely depending upon application. A preferred embodiment, as shown in top view in FIG. 7, has dimensions approximately as follows: plate 18 is 330 microns square; beams 14 are 30 microns wide and 350 microns between support/anchor structure 22, 24 and plate 18; dielectric layers 54 and 58 depend upon the insulation thickness required between plates, and, along with the metallization thickness, upon the structural strength desired for the supporting beam.

A variation in processing is needed to accommodate the beam structure shown in FIGS. 3a and 3b, which has the right end free from anchoring. One such variation is to omit pad 12 during the metallization patterning step of FIG. 6a. Then, when forming features 51 and 50, feature 51 can be made somewhat differently than shown in FIG. 6b. A timed etch can remove sacrificial layer 52 above pad 10 to form feature 50 as usual, but leave some of sacrificial layer 52 above substrate 4 when forming feature 51. The steps in FIG. 6c would then be completed in the usual manner, leaving a thin part of sacrificial layer 52 below the supporting part of the beam structure. When the sacrificial layer 52 is removed, the beam will be freed on the right end, reducing the resistance of the transducer to bring plate 18 closer to capacitive plate 2. This would reduce bending of plate 18 from beam tension, and make the transducer bending resistance more negligible compared to the diaphragm actuator, so as to help ensure linearity of response.

Figure 8A:
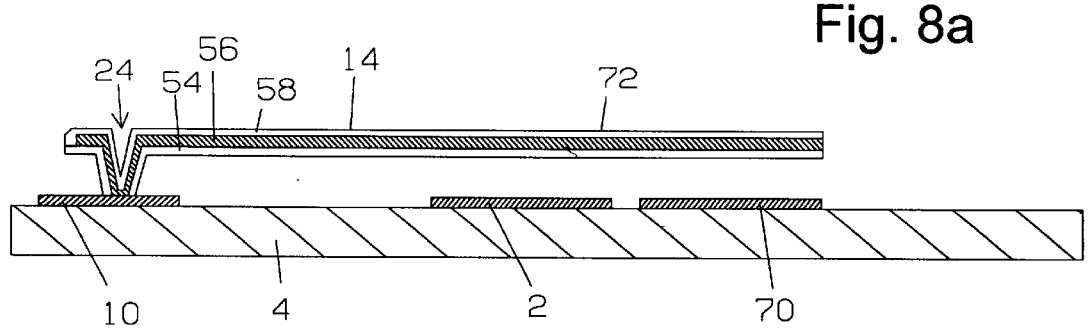
FIGS. 8a, b show a section and top view of a cantilever transducer.
Figure 8B:
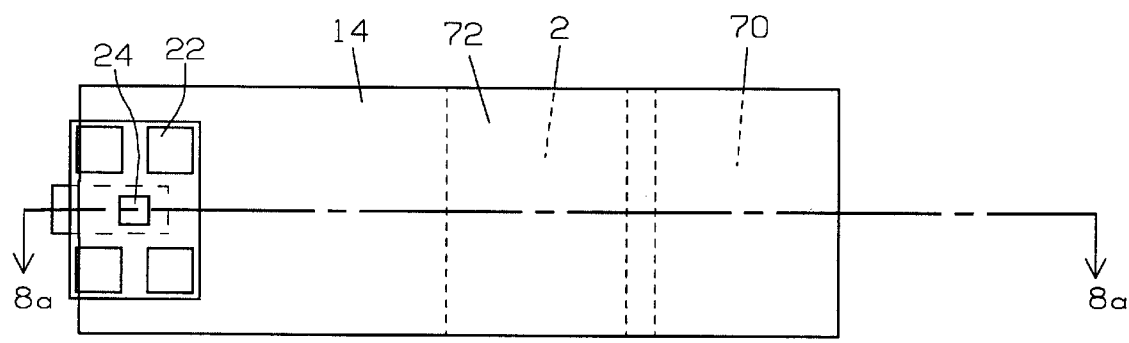

FIGS. 8a, b show a section and top view respectively of another variation on a transducer for use with the present invention, in which the upper plate is reference item 72. Plate 72 is supported from pad 10 as a cantilever structure, with beam 14 supporting plate 72 and held in turn by means of interconnect 24 and anchor structures 22 from substrate 4.

Pad 70 and capacitive plate 2 may be joined as a single capacitive plate to form a capacitive transducer for use as shown for the beam-supported structures described above. In that event, cantilever beam 14 is preferably attached to an actuating item such as diaphragm 6 of FIG. 3b, and beam 14 may be narrowed to about 60 microns wide, as necessary, to help ensure that the resistance of the beam is negligible to the forces moving the diaphragm and transducer together.

However, if pad 70 and capacitive plate 2 are separated as shown, then pad 70 can be used to convert an input signal into an electrostatic force which can move transducer plate 72, instead of the plate being actuated by pressure or force. In this event it is preferred that cantilever beam 14 be as wide as capacitive plate 2, that is approximately 333 microns, in order to enhance the stiffness of the transducer. The distance d between plates 2 and 72 may be controlled in this configuration by voltage V between plates 72 and 70, as long as the voltage between plate 2 and plate 72 is negligible by comparison to V. In this event, the relationship will be: $d=d_0+k\ V^{2/3}$. Therefore, if $V=S^{3/2}/k$, a correlation of signal S with input current $i(t+\tau)$ will be obtained in the way described above, without need for a diaphragm or other means to direct an mechanical force to the capacitive transducer.

The invention has been described in exemplary embodiments, but is not to be limited thereto. Rather, it is defined only by the claims which follow.

What is claimed is:

1. A method for comparing a reference signal to a pressure signal, the method comprising the steps of:
    disposing first and second electrically conductive plates separated by a distance d such that each point of the first plate is separated from all points of the second plate by at least a distance of approximately d;
    providing an actuator which changes the distance d separating the two plates as a function of an applied pressure;
    driving a current based upon the reference signal between the two plates; and
    observing the voltage thereby produced between the two plates, which voltage represents a correlation function between the pressure signal and the reference electrical signal.

2. The method of claim 1 in which the actuator changes distance d substantially as a linear function of the applied pressure.

3. The method of claim 2 in which the pressure is a fluid pressure.

4. The method of claim 1 wherein the driven current is proportional to the reference signal sought to be compared.

5. The method of claim 1 wherein the driven current is proportional to the reference signal with a modifiable delay component $\tau$, such that the driven current is $i(t+\tau)$.

6. The method of claim 1 wherein the step of providing an actuator comprises sealing a diaphragm over the plates.

7. The method of claim 1 wherein the step of providing an actuator includes sealing the first and second plates from the atmosphere and at least partially evacuating gases around the plates.

8. The method of claim 1 wherein the step of disposing the first and second plates includes disposing one plate on a substrate, and disposing the other plate on a plate-supporting beam.

9. The method of claim 8 including providing support for the plate-supporting beam at two ends.

10. The method of claim 8 including cantilevering the plate-supporting beam from one end.

11. An apparatus for comparing a time-varying reference signal r(t) to a time-varying force, comprising:
    first and second electrically conductive plates disposed a distance d apart from each other such that points on the first plate are at least approximately distance d away from points on the second plate;
    an actuator for changing the distance d between the two plates in response to the time-varying force;
    a current source for driving a time-varying current between the first and second plates, the current being i(t) corresponding to the reference signal r(t); and
    a voltage output coupled to said first and second electrically conductive plates, said voltage output providing a voltage which reflects a correlation function between the time-varying reference signal and the time-varying force.

12. The apparatus of claim 11 wherein distance d is substantially a linear function of a fluid pressure which creates the applied force.

13. The apparatus of claim 11 wherein the current is a linear function of the reference signal and a modifiable delay component $\tau$, such that the driven current is $i(t+\tau)$.

14. The apparatus of claim 11 wherein the actuator comprises a diaphragm sealed over the first and second plates, and gases are at least partly evacuated from the region sealed by the diaphragm.

15. The apparatus of claim 11 wherein the first plate is disposed on a substrate, and the second plate is disposed on a plate-supporting beam.

16. The apparatus of claim 15 wherein a substantial portion of a length of the plate-supporting beam has been separated from the substrate by etching, and is supported from the substrate at two or more points, at least one of which is anchored.

17. The apparatus of claim 15 wherein a substantial portion of a length of the plate-supporting beam has been separated from the substrate by etching, and is cantilevered from a single supporting end.

18. A method of comparing a first time-varying relationship to a second time-varying relationship, comprising the steps of:
    supporting a first conductive signal plate such that it is separated from a first conductive reference plate by a variable distance d;
    supporting a second conductive signal plate such that it is separated from a second conductive reference plate by a distance controlled by said variable distance d;
    applying a first electrical drive signal to said first conductive signal plate with respect to said first conductive reference plate such that said variable distance d changes as a function of said first electrical drive signal, where said first electrical drive signal is a known function of said first time-varying relationship;
    applying a second electrical drive signal to said second conductive signal plate with respect to said second conductive reference plate, said second electrical drive signal being a known function of said second time-varying relationship; and
    measuring a resultant electrical signal between said second conductive signal plate and said second conductive reference plate, said resultant electrical signal representing a correlation between said first and second time-varying relationships.

19. The method of claim 18 wherein said first and second conductive reference plates are connected to each other so as to be at the same electrical potential.

20. The method of claim 18 where the step of supporting a first conductive signal plate by a variable distance d from a first conductive reference plate includes disposing one of the plates on a substrate and the other on a beam separated from the substrate through an etching process.

21. An apparatus for correlating a time-varying reference signal with a time-varying pressure signal, the apparatus comprising:
    a substrate;
    a first conductive pad deposited on said substrate;
    a capacitive plate deposited on said substrate;
    a plate supporting beam disposed above said capacitive plate, said plate supporting beam comprising a conductive upper plate contained with an insulating layer, said upper plate disposed a distance d above said capacitive plate, said upper plate electrically coupled to said first pad and said plate supporting beam mechanically coupled to said substrate at said first pad;
    a current source coupled to said capacitive plate and said first pad, said current source providing a current output corresponding to the time-varying reference signal;
    a diaphragm adapted to receive the time-varying pressure signal, said diaphragm disposed above said upper plate and having a perimeter sealed to said substrate; and
    a voltage output coupled to said first pad and said capacitive plate, said voltage output providing a voltage which reflects a correlation function between the time varying reference signal and the time-varying pressure signal.

22. The apparatus of claim 21, wherein said substrate has a recess and said capacitive plate, said first pad, and said plate supporting beam are disposed within said recess.

23. The apparatus of claim 22, wherein said recess has a circular shape defined by a circular perimeter wall and said diaphragm has a circular shape corresponding to the circular shape of the recess and the diaphragm is edge-clamped to said circular perimeter wall.

24. The apparatus of claim 21 further comprising a means for mechanically coupling at least a portion of said diaphragm to said plate supporting beam.

25. The apparatus of claim 21 further comprising a second conductive pad deposited on said substrate, said upper plate electrically coupled to said second pad and said plate supporting beam further mechanically coupled to said substrate at said second pad.

26. An apparatus for correlating a time-varying reference signal with a time-varying input signal, the apparatus comprising:

a substrate;

a first conductive pad deposited on said substrate;

a capacitive plate deposited on said substrate;

a conductive anchor plate deposited on said substrate;

a plate supporting beam disposed above said capacitive plate and said electrostatic plate, said plate supporting beam comprising a conductive upper plate contained with an insulating layer, said upper plate disposed a distance d above said capacitive plate, said upper plate electrically coupled to said first pad and said plate supporting beam mechanically coupled to said substrate at said first pad;

a current source coupled to said capacitive plate and said first pad, said current source providing a current output corresponding to the time-varying reference signal;

a voltage input coupled to said upper plate and said anchor plate, said anchor plate providing a voltage corresponding to the time-varying input signal; and a voltage output coupled to said first pad and said capacitive plate, said voltage output providing a voltage which reflects a correlation function between the time-varying reference signal and the time-varying input signal.

27. The apparatus as claimed in claim 26, wherein said distance d is controlled by said voltage input.

28. The apparatus as claimed in claim 26, wherein said voltage input is controlled to have a time varying value proportional to said time varying signal raised to the 3/2 power.

* * * * *